United States Patent [19]
Ito

[11] Patent Number: 5,668,919
[45] Date of Patent: Sep. 16, 1997

[54] CAMERA

[75] Inventor: Kazumi Ito, Mitaka, Japan

[73] Assignee: Olympus Optical Co., Ltd., Tokyo, Japan

[21] Appl. No.: 663,519

[22] Filed: Jun. 13, 1996

[30] Foreign Application Priority Data

Jun. 20, 1995 [JP] Japan .................. 7-153473

[51] Int. Cl.$^6$ .................. G03B 7/099; G03B 13/18; G03B 13/20
[52] U.S. Cl. .................. 396/268; 396/270; 396/272
[58] Field of Search .................. 354/479, 163, 354/403; 396/268, 270, 272, 233, 100, 111, 65, 107, 121

[56] References Cited

U.S. PATENT DOCUMENTS

| | | | |
|---|---|---|---|
| 4,053,240 | 10/1977 | Aizawa et al. | 354/163 |
| 4,470,686 | 9/1984 | Miyata . | |
| 4,785,322 | 11/1988 | Harrison et al. | 354/403 |
| 4,864,345 | 9/1989 | Mukai | 354/403 |
| 4,974,009 | 11/1990 | Tsuji | 354/403 |
| 5,283,608 | 2/1994 | Goo et al. | 354/403 |
| 5,341,186 | 8/1994 | Kato . | |
| 5,361,118 | 11/1994 | Taka et al. | 354/403 |
| 5,389,996 | 2/1995 | Oda et al. | 354/403 |

FOREIGN PATENT DOCUMENTS 63-70835  3/1988  Japan .

*Primary Examiner*—Safet Metjahic
*Assistant Examiner*—Michael Dalakis
*Attorney, Agent, or Firm*—Cushman, Darby & Cushman IP Group of Pillsbury Madison & Sutro LLP

[57] ABSTRACT

A camera includes a photometric optical system and a range measuring optical system which are provided independently of a photographing optical system so that the optical path of the photometric optical system and that of a projection or reception system of the range measuring optical system go through a single window. In this way, space-saving of the front of a camera body can be intended to facilitate compactness of the camera.

16 Claims, 4 Drawing Sheets

CAMERA

BACKGROUND OF THE INVENTION

1. Field of the Invention

This invention relates to a camera equipped with an active range measuring device using infrared rays and a photometric device, and in particular, to a compact camera equipped therewith.

2. Description of Related Art

A compact camera, as shown in FIG. 1, is in general designed so that a camera body 10 has a photographic lens 11, a finder lens 12, a photometric optical system 13, a range measuring optical system 14, and a flash 15 in the space of its front. In keeping with compact design of cameras in recent years, however, the problem is encountered that space for arrangements of the finder lens, the photometric optical system, and the range measuring optical system must be narrowed. Any of such optical systems to be arranged in the space of the front of the camera body requires an opening directed toward an object. With the exception of the photographic lens, at least four openings are required for the flash, finder system, photometric optical system, and range measuring optical system. Thus, it is considered that parts of the optical systems which must be arranged in the space of the front of the camera body are used in common for compact design. Actually, a combination of the finder system with the photometric optical system is proposed. Further, a combination of the finder system with an infrared projection device for range measurement is also proposed, for example, by U.S. Pat. No. 5,341,186.

However, the former combination of the finder system with the photometric optical system has the defect that since visible light is shared between the finder system and the photometric optical system, the amounts of light of both the systems are insufficient and an image available becomes dark.

The latter combination disclosed in U.S. Pat. No. 5,341,186 is such that parts of the finder system and the projection optical system for range measurement are used in common, and originally, its chief purpose is to eliminate parallax between both systems. Although this arrangement can certainly meet space-saving of the front of the camera body, it is required that a path splitting plane disposed in a common optical system is manufactured with a high degree of accuracy. Thus, since the manufacture of the path splitting plane is attended with difficulty, the arrangement has little practical use.

In order to solve these problems, a combination of the photometric optical system with an infrared range measuring optical system is considered. Actually, such arrangements are proposed, for example, by U.S. Pat. No. 4,470,686 and Japanese Patent Preliminary Publication No. Sho 63-70835. These arrangements, as shown in FIG. 2, are such that parts of a photometric optical system 21 and a range measuring optical system 22 are used in common, and optical paths for use in the optical systems 21 and 22 are divided. However, either of the arrangements is directed to an optical system for single-lens reflex cameras, which makes the range measurement with visible light and is not applicable to a compact camera equipped with the infrared range measuring optical system.

SUMMARY OF THE INVENTION

It is, therefore, an object of the present invention to provide a camera in which the optical system of an infrared active range measuring device and a photometric optical system have partially a common optical path and thereby further compact design is attained.

In order to achieve this object, the camera according to the present invention includes a photometric optical system and a range measuring optical system which are provided independently of a photographing optical system, so that the optical paths of the photometric optical system and of the projection or reception system of the range measuring optical system go through a single window.

Further, the camera of the present invention has path splitting means in the optical path going through the single window so that one of divided paths is used for the photometric optical system and the other is used for the range measuring optical system. The optical system of an infrared active range measuring device is used in the range measuring optical system.

Still further, in the camera of the present invention, it is desirable that the path splitting means is composed of an element capable of selectively transmitting or reflecting infrared rays.

This and other objects as well as the features and advantages of the present invention will become apparent from the following detailed description of the preferred embodiments when taken in conjunction with the accompanying drawings.

DETAILED DESCRIPTION OF THE PREFERRED EMBODIMENTS

Figure 1:
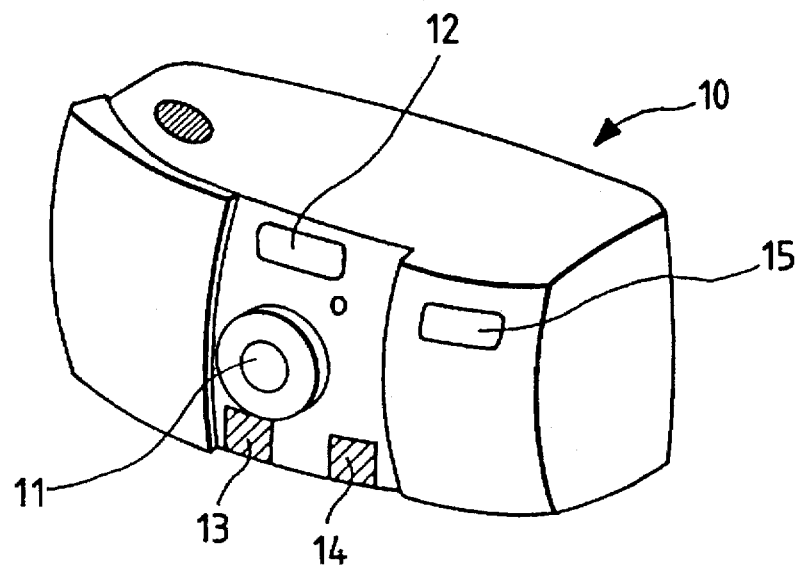
FIG. 1 is a perspective view showing the body of a conventional compact camera.
Figure 2:
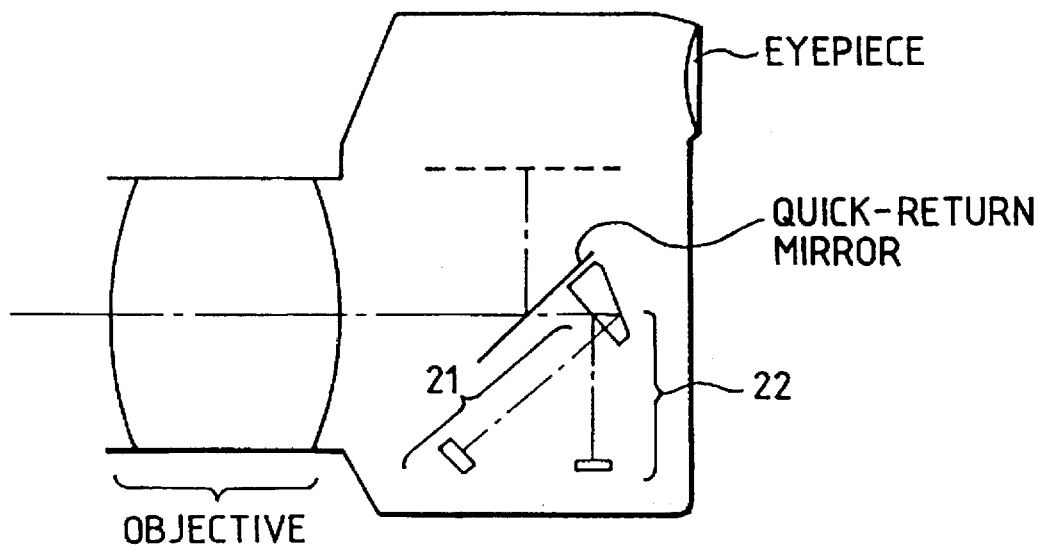
FIG. 2 is a schematic view showing the arrangement of a combined photometric and range measuring optical system used in a single-lens reflex camera.
Figure 3:
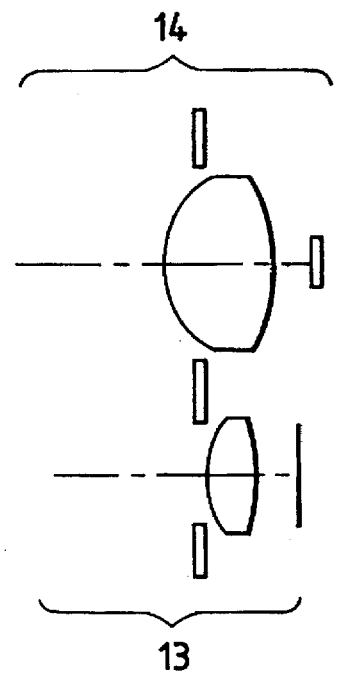
FIG. 3 is a view showing arrangements of the photometric optical system and the range measuring optical system which are used in the conventional camera.
Figure 4:
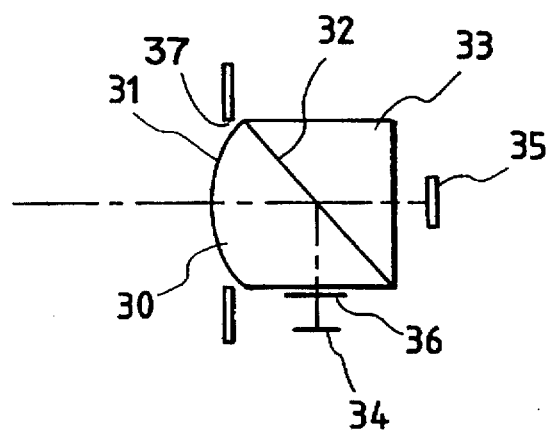
FIG. 4 is a view showing the arrangement of a combined photometric and range measuring optical system used in a camera according to the present invention.

A combined photometric and range measuring optical system provided in the camera of the present invention is not constructed with the photometric optical system 13 and the range measuring optical system 14 which are independent of each other, such as those used in the conventional example shown in FIG. 3, but, as shown in FIG. 4, constructed with, in order from the object side not shown, a first prism 30 having an incident surface 31 of a positive power and a path splitting surface 32 for dividing an optical path and a second prism 33. A path of light going through a single entrance window 37 is split by the path splitting surface 32. The path splitting surface 32 is placed so that one part of split light is introduced into a photometric element 34 and the other is introduced into a range measuring element 35 for projecting or receiving an infrared ray through the second prism 33. Moreover, an element 36 having a positive power is disposed in an optical path for photometry. The element 36 is a planar optical element such as a diffraction grating or a Fresnel lens. Also, instead of this element, an ordinary lens may be used.

In the camera of the present invention, range measurement is mainly made in the vicinity of the center of the visual field and thus does not require a wide angle of view, while photometry must be performed over the entire field and thus requires a wider angle of view to be held. In FIG. 4, the element 36 having a positive power disposed in the optical path for photometry is composed of a miniature photometric element, which allows a wide range of photometry.

In the camera of the present invention, as mentioned above, the photometric optical system and the range measuring optical system have partially a common optical path, and hence a single entrance window can be used to introduce incident light into the photometric optical system and the range measuring optical system. In this way, space-saving of the front of the camera body can be facilitated, resulting in further compactness of the camera.

In accordance with the drawings shown, the present invention will be explained in detail below.

First embodiment

Figure 5:
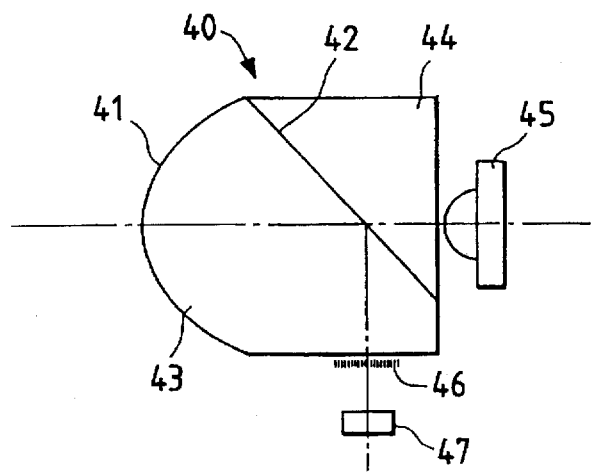
FIG. 5 is a view showing the arrangement of a combined photometric and range measuring optical system used in a first embodiment of the camera according to the present invention.

The photometric optical system and the range measuring optical system which are used in this embodiment, as shown in FIG. 5, are constructed so that parts of their optical paths are used in common by providing an optical system 40. The optical system 40 includes, in order from the object side not shown, a first prism 43 having a positive aspherical entrance surface 41 and a path splitting surface 42 making an angle of nearly 45° with the optical axis; and a second prism 44 for introducing light transmitted through the path splitting surface 42 into a range measuring element 45. As the path splitting surface 42, a cold mirror is used which is capable of selectively transmitting an infrared ray for range measurement.

On the other hand, the exit surface of the first prism 41 from which light reflected by the path splitting surface 42 emerges is configured with a Fresnel lens 46. The light passing through the Fresnel lens 46 is incident on a photometric element 47 placed under the Fresnel lens 46.

The path splitting surface 42, for which the cold mirror is used as described above, is capable of splitting incident rays of light into infrared light and visible light to introduce only the infrared light into the range measuring element 45 and only the visible light into the photometric element 47. Hence, the utilization efficiency of the incident rays introduced into individual elements can be improved. Furthermore, it is not necessary to place a visible-light cut filter and an infrared-light cut filter ahead of the range measuring element 45 and the photometric element 47, respectively, and thus compact design of the combined photometric and range measuring optical system can be intended. Because the exit surface of the first prism 43 from which the light reflected by the path splitting surface 42 emerges is configured with the Fresnel lens 46, photometry becomes possible in a wide range of field with the miniature photometric element. Also, even when a working plane making use of diffraction (hereinafter referred to as DOE) is used instead of the Fresnel lens 46, the same effect can be secured. The Fresnel lens 46 may be replaced by an ordinary lens.

Figure 6:
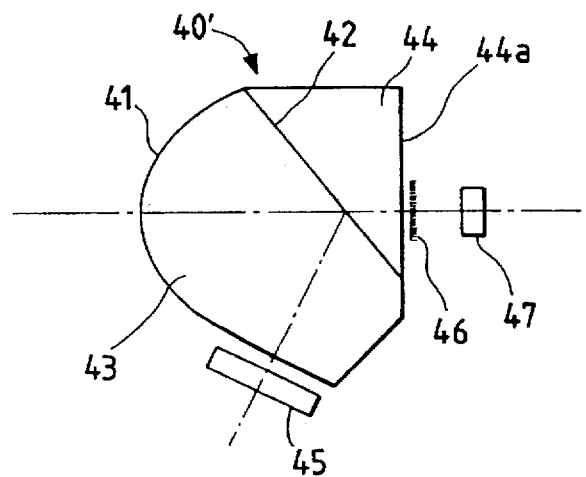
FIG. 6 is a view showing another arrangement of a combined photometric and range measuring optical system used in the first embodiment.

Furthermore, as shown in FIG. 6, it is possible to construct an optical system 40' in which an angle made by the path splitting surface 42 with the optical axis is different from that of FIG. 5, and to reverse the positions of the photometric element 45 and the range measuring element 47. In the case of such an arrangement, however, an element having properties of selectively reflecting infrared rays will be used as the path slitting surface 42, and the Fresnel lens 46 will be interposed between an exit surface 44a of the second prism 44 and the photometric element 47. Moreover, in this case, the optical path length of the second prism 44 can be made shorter than that on the reflection side of the first prism 43. Thus, where a narrow-base infrared light-emitting diode (hereinafter referred to as IRLED) equipped with a positive lens by which the back focal distance of an imaging optical system must be made long, as in the range measuring element 45 of FIG. 5, is used as a range measuring element, it is more advantageous that the range measuring element is placed in the optical path on the transmission side of the path splitting surface 42.

Further, where an element having a positive power (for example, the Fresnel lens 46) is disposed in the photometric optical system, it is desirable that the element is located separate from the imaging position of the first prism 43, and also it is better that the optical path length of the prism after the transmission or reflection by the path splitting surface 42 is diminished. Thus, in the arrangement of FIG. 6, where the range measuring element 45 is composed of a light-receiving element or the light-projecting element of a planar IRLED, it is favorable that the photometric element 47 is placed on the transmission side of the path splitting surface 42 if the range measuring element 45 may be situated on the reflection side of the path splitting surface 42.

Second embodiment

Figure 7:
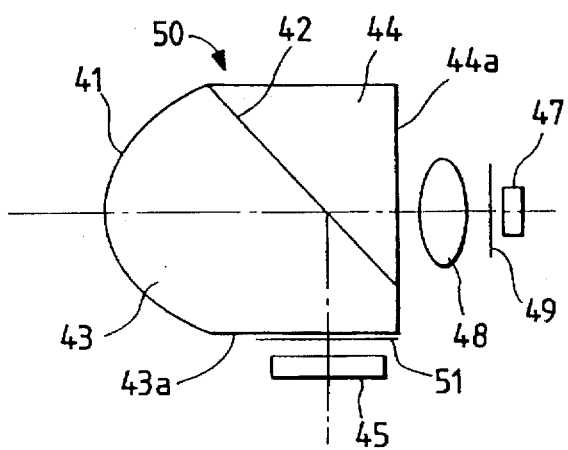
FIG. 7 is a view showing the arrangement of a combined photometric and range measuring optical system used in a second embodiment of the camera according to the present invention.

The photometric optical system and the range measuring optical system which are used in this embodiment, as shown in FIG. 7, are constructed so that parts of their optical paths are used in common by providing an optical system 50. The optical system 50 includes, in order from the object side not shown, the first prism 43 having the positive aspherical entrance surface 41 and the path splitting surface 42 making an angle of nearly 45° with the optical axis; and the second prism 44 for introducing light transmitted by the path splitting surface 42 into the photometric element 47. As the path splitting surface 42, a half mirror is used. In addition, a positive lens 48 is interposed between the exit surface 44a of the second prism 44 and the photometric element 47. In the second embodiment, since the half mirror is used for the path splitting surface 42, incident light cannot be split into infrared light and visible light. If, however, the path splitting surface 42 is coated with a reflecting film, and an infrared-light cut filter 49 and a visible-light cut filter 51 are respectively interposed between the positive lens 48 and the photometric element 47 and between an exit surface 43a for emergence of light reflected by the path splitting surface 42 and the range measuring element 45, the same effect as in the optical system 40 of the first embodiment can be brought about. In this case, in order to ensure the amount of light for range measurement, it is desirable that the amount of reflection of light is made larger than that of transmission of light by the reflecting film applied to the path splitting surface 42 so that a larger amount of light reaches the range measuring element 45.

In particular, the second embodiment is designed so that the placement of the positive lens 48 on the side of the photometric element 47 allows photometry in a wide range of field with a miniature photometric element.

In the second embodiment also, where the range measuring element 45 is composed of a light-receiving element or the light-projecting element of a planar IRLED, it is favorable that the photometric element 47 is placed on the transmission side of the path splitting surface 42 if the range measuring element 45 may be situated on the reflection side of the path splitting surface 42.

Third embodiment

Figure 8:
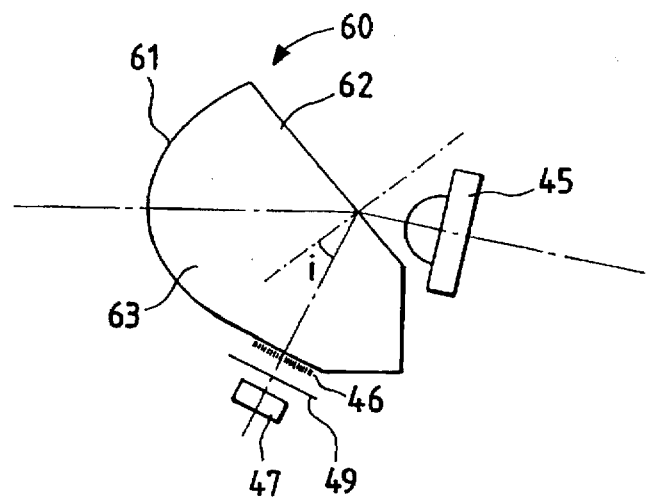
FIG. 8 is a view showing the arrangement of a combined photometric and range measuring optical system used in a third embodiment of the camera according to the present invention.

The photometric optical system and the range measuring optical system which are used in this embodiment, as shown in FIG. 8, are constructed so that parts of their optical paths are used in common by providing an optical system 60. The optical system 60 includes only a prism 63 having the positive aspherical entrance surface 61 and a path splitting surface 62 making an angle of nearly 30° with the optical axis. The path splitting surface 62 is designed so that even though a coating is not applied in particular, an angle made by the path splitting surface 62 with the optical axis can be adjusted to determine the share of the amount of light to be divided. Calling i the angle made by the normal of the path splitting surface 62 with the optical axis of the photometric optical system and N the refractive index of the prism 63, unless the path splitting surface 62 is configured so that $i < \sin^{-1}(1/N)$ is satisfied, incident light will undergo total reflection at the path splitting surface 62. In the optical system 60 used in the third embodiment, since the second prism 44 such as that shown in each of the first and second embodiments is not used, the optical path from the path splitting surface 62 to the range measuring element 45 can be formed so that its optical axis is inclined, and its depth can be reduced. Although the exit surface for emergence of light reflected by the path splitting surface 62 is provided with the Fresnel lens 46 as in other embodiments, it is needless to say that, instead of this, an element such as the DOE or a lens may be placed. Also, between the Fresnel lens 46 and the photometric element 47, the infrared-light cut filter 49 is disposed.

Figure 9:
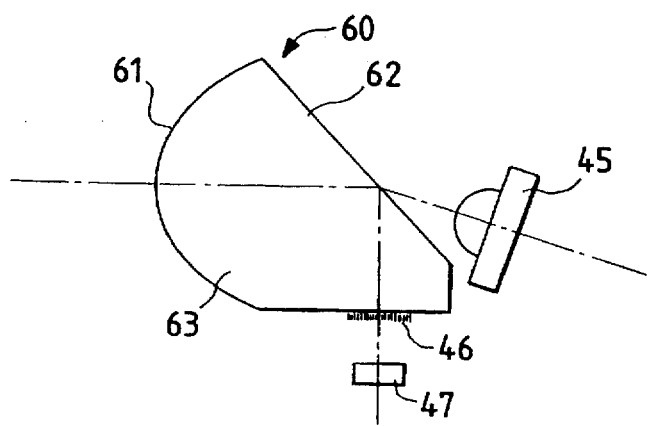
FIG. 9 is a view showing another arrangement of a combined photometric and range measuring optical system used in the third embodiment.

For the optical system 60 used in the camera of the third embodiment, as shown in FIG. 9, it is possible to prevent total reflection of incident light by applying a coating to the path splitting surface 62, and to properly divide optical paths for reaching the range measuring element 45 and the photometric element 47 by providing the path splitting surface 62 with arbitrary properties. In this case, even where the path splitting surface 62 does not fulfill the condition of total reflection, it is useful to apply the coating in order to control more arbitrarily the properties of this splitting surface. A cold mirror may be used as the path splitting surface 62.

Fourth embodiment

Figure 10:
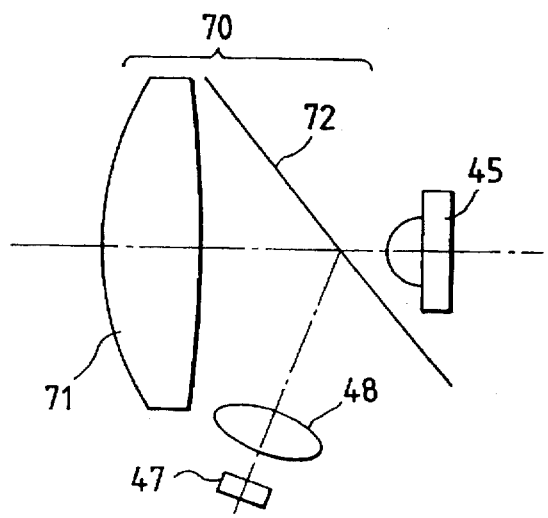
FIG. 10 is a view showing the arrangement of a combined photometric and range measuring optical system used in a fourth embodiment of the camera according to the present invention.

The photometric optical system and the range measuring optical system which are used in this embodiment, as shown in FIG. 10, are constructed so that parts of their optical paths are used in common by providing an optical system 70. The optical system 70 includes, in order from the object side not shown, a convex lens 71 having a positive power and a path splitting plane 72 for dividing the optical path. A cold mirror for selectively transmitting infrared light for range measurement is used as the path splitting plane 72. The range measuring element 45 is placed on the transmission side of the path splitting plane 72, while the photometric element 47 is situated on the side of the optical path formed by reflection from the path splitting plane 72. Further, between the path splitting plane 72 and the photometric element 47, the positive lens 48 is placed.

As mentioned above, in the fourth embodiment, in which the cold mirror is used for the path splitting plane 72, incident light can be split into infrared light and visible light, so that only the infrared light is introduced into the range measuring element 45 and only the visible light into the photometric element 47. Consequently, the utilization efficiency of incident rays can be improved. Furthermore, since the infrared-light cut filter need not be disposed between the path splitting plane 72 and the range measuring element 45, and the visible-light cut filter also need not be placed between the photometric element 47 and the positive lens 48, compact design of the combined photometric and range measuring optical system can be intended. Because the positive lens 48 is situated on the side of photometric element 47, photometry becomes possible in wide range of field with the miniature photometric element.

In addition, the optical system 70 of the fourth embodiment is constructed so that an entrance surface for incidence of light from the object is used as the convex lens 71, and thus two lens surfaces are provided in front of the path splitting plane 72. In this way, since the radius of curvature of each surface can be made larger than in the prism, a projection on the object side is limited. This is advantageous to layout in mounting the optical system in the camera.

What is claimed is:

1. A camera, comprising:
 a photometric optical system and a range measuring optical system which are provided independently of a photographing optical system, said range measuring optical system having a projection system and a reception system;
 a path splitting surface which splits a common optical path passing through a single entrance window in said camera into respective optical paths for said photometric optical system and for one of said projection system and said reception system of said range measuring optical system; and
 an optical element arranged between said path splitting surface and a photometric element of said photometric optical system.

2. A camera according to claim 11, wherein said range measuring optical system is an optical system of an infrared active range measuring device.

3. A camera according to claim 11, wherein said optical element has a positive power.

4. A camera according to claim 11, wherein said path splitting surface is formed at an interface between two prisms which are bonded together.

5. A camera according to claim 11, wherein said path splitting surface has a wavelength selectivity to split light incident thereon according to wavelength.

6. A camera according to claim 11, wherein said path splitting surface introduces a larger portion of infrared rays incident thereon into said range measuring optical system, and introduces a larger portion of visible rays incident thereon into said photometric optical system.

7. A camera according to claim 11, wherein a surface of an optical component is used as said path splitting surface, said path splitting surface being positioned so as to be in contact with air on a transmission side thereof, and a material of said optical component and an angle of said path splitting surface being arranged to satisfy a condition:

$i < \sin^{-1}(1/N)$ where i is an angle formed between a normal to said path splitting surface and an optical axis of optical components arranged on an incident side of said path splitting surface, and N is a refractive index of said material.

8. A camera according to claim 3, wherein said positive power optical element is a convex lens.

9. A camera according to claim 3, wherein said positive power optical element is a Fresnel lens.

10. A camera according to claim 3, wherein said positive power optical element is a surface utilizing diffraction of light.

11. A camera according to claim 3, wherein said positive power optical element is arranged on a surface of two prisms which have been bonded together, an interface between said two prisms forming said path splitting surface.

12. A camera according to claim 3, wherein said range measuring optical system is an optical system of an infrared active range measuring device.

13. A camera according to claim 3, wherein said path splitting surface is formed at an interface between two prisms which are bonded together.

14. A camera according to claim 3, wherein said path splitting surface has a wavelength selectivity to split light incident thereon according to wavelength.

15. A camera according to claim 3, wherein said path splitting surface introduces a larger portion of infrared rays incident thereon into said range measuring optical system, and introduces a larger portion of visible rays incident thereon into said photometric optical system.

16. A camera according to claim 3, wherein a surface of an optical component is used as said path splitting surface, said path splitting surface being positioned so as to be in contact with air on a transmission side thereof, and a material of said optical component and an angle of said path splitting surface being arranged to satisfy a condition:

$i < \sin^{-1}(1/N)$ where i is an angle formed between a normal to said path splitting surface and an optical axis of optical components arranged on an incident side of said path splitting surface, and N is a refractive index of said material.

* * * * *

UNITED STATES PATENT AND TRADEMARK OFFICE
CERTIFICATE OF CORRECTION

PATENT NO. : 5,668,919
DATED : September 16, 1998
INVENTOR(S) : ITO

It is certified that error appears in the above-identified patent and that said Letters Patent is hereby corrected as shown below:

IN THE CLAIMS:

Column 6, line 46, read "claim 11" as --claim 1--.
"  ", line 49, read "claim 11" as --claim 1--.
"  ", line 51, read "claim 11" as --claim 1--.
"  ", line 54, read "claim 11" as --claim 1--.
"  ", line 57, read "claim 11" as --claim 1--.
"  ", line 62, read "claim 11" as --claim 1--.
Column 7, line 15, read "dement" as --element--.

Signed and Sealed this

Twenty-fifth Day of May, 1999

*Attest:*

Q. TODD DICKINSON

*Attesting Officer*          *Acting Commissioner of Patents and Trademarks*